United States Patent [19]

Renaud et al.

[11] Patent Number: 4,481,436
[45] Date of Patent: Nov. 6, 1984

[54] ELECTRIC MOTOR, PROCESS FOR MOUNTING, AND WIRING SUBASSEMBLY

[75] Inventors: André Renaud, Fontenay le Fleury; Henri Chauviere, Courbevoie, both of France

[73] Assignee: Etudes Techniques et Representations Industrielles E.T.R.I., Neuilly sur Seine, France

[21] Appl. No.: 435,310

[22] Filed: Oct. 19, 1982

[30] Foreign Application Priority Data

Oct. 23, 1981 [FR] France .................. 81 19893

[51] Int. Cl.³ .................. H02K 5/08; H02K 11/00
[52] U.S. Cl. .................. 310/71; 310/68 B; 310/89
[58] Field of Search .......... 310/71, 89, 216, 171, 310/268, 42, 68 R, 68 B, 85

[56] References Cited

U.S. PATENT DOCUMENTS

| | | | |
|---|---|---|---|
| 3,483,408 | 12/1969 | Frohmüller et al. | 310/71 |
| 3,484,860 | 12/1969 | Csaki | 310/71 |
| 3,548,223 | 12/1970 | Dittrich et al. | 310/10 |
| 3,809,935 | 5/1974 | Kristen et al. | 310/68 R |
| 4,137,560 | 1/1979 | Moore | 310/68 D |
| 4,259,603 | 3/1981 | Uchiyama et al. | 310/68 D |

FOREIGN PATENT DOCUMENTS 1002865 2/1957 Fed. Rep. of Germany ........ 310/71
2382124 9/1978 France .

Primary Examiner—J. D. Miller
Assistant Examiner—D. L. Rebsch
Attorney, Agent, or Firm—Young & Thompson

[57] ABSTRACT

The electric motor with radial air gap comprises a rotor, a stator having a magnetic circuit and windings which form winding heads projecting with respect to the magnetic circuit at the axial ends thereof, a case whose end wall extends radially and a sensor for detecting the position of the rotor fixed on an electrically insulating disc separating that end wall from the winding heads situated on the same side as this wall, applied and immobilized against the case. The sensor has terminals connected to connecting wires which issue from the case at a point remote from the connection point thereof with the terminals, and the internal face of the disc has guide means for leading the wires from one point to the other while passing at a distance from the rotor and the winding heads, which come very close to the end wall.

12 Claims, 5 Drawing Figures

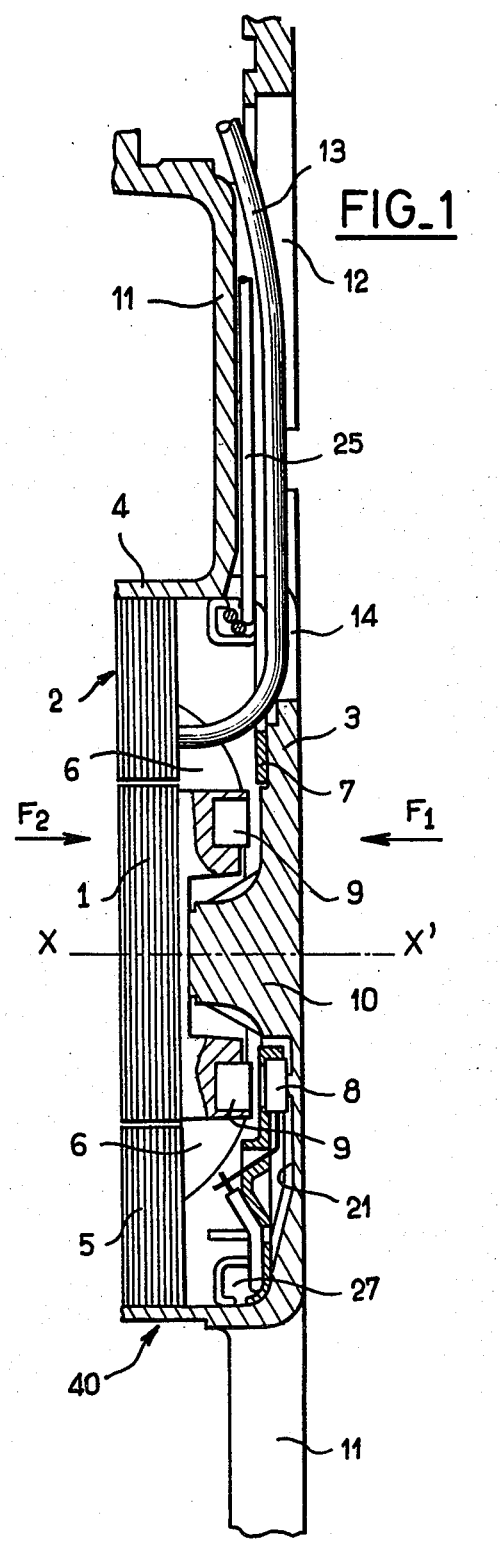
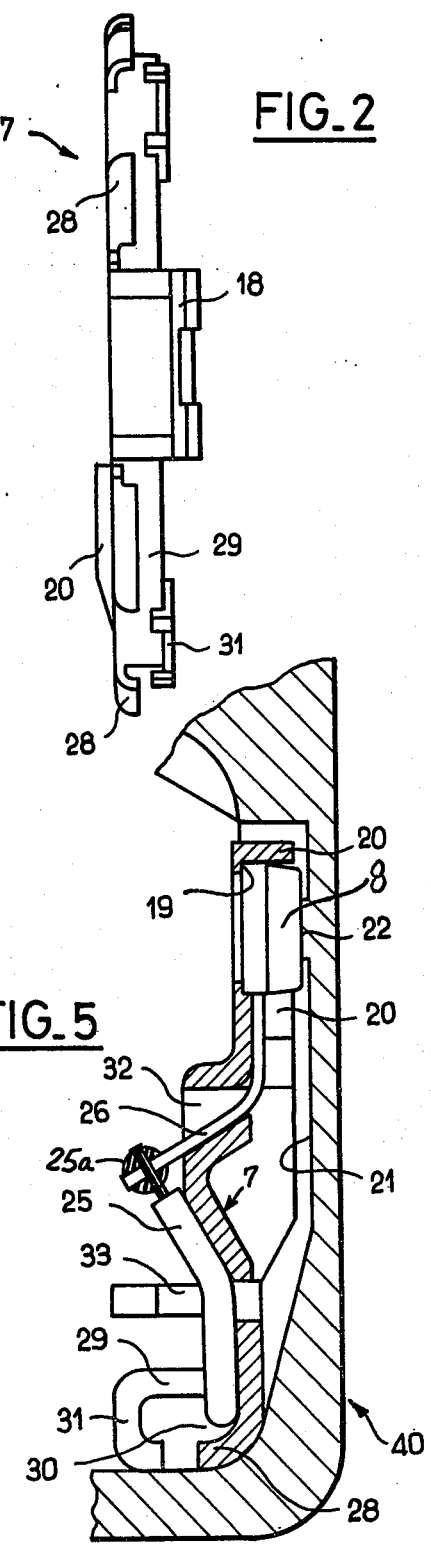

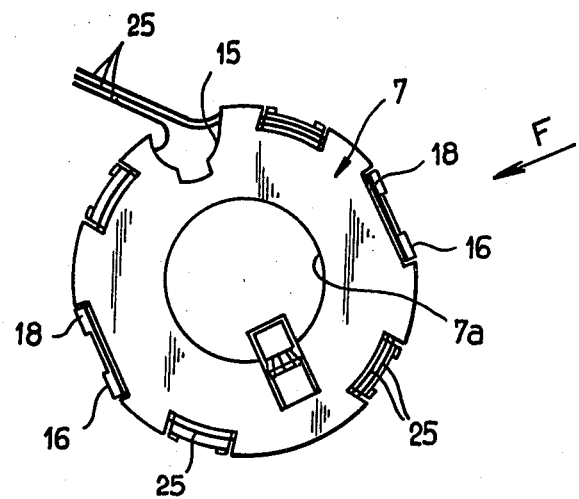
FIG_3
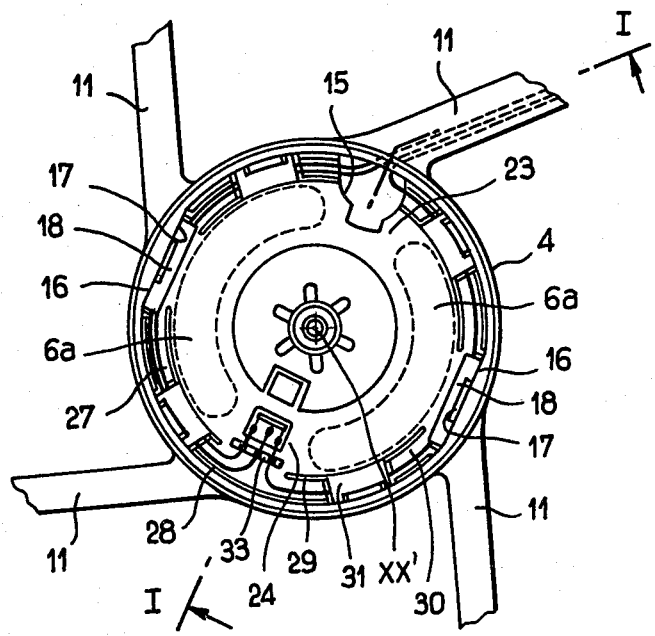
FIG_4

ELECTRIC MOTOR, PROCESS FOR MOUNTING, AND WIRING SUBASSEMBLY

The invention relates to an electric motor comprising a rotor, a stator, a case whose end wall extends substantially radially and a position sensor placed between the rotor and said wall.

It relates more particularly to a motor taking up a reduced space axially, such as those used in flat fans, whose main application is to cool electronic components in apparatus.

In such a motor, the position sensor may serve more especially for monitoring the speed of rotation of the rotor. Considering space restrictions, it is advantageous to use as a sensor a Hall generator, in front of which travels a pole of a permanent magnet carried by the rotor and facing the end wall of the case. Hall generators in fact occupy a reduced volume and have, in particular, small thickness in the direction of the magnetic field to be detected, which corresponds to the direction of the axis of the motor.

A Hall generator, because of its reduced dimensions, is delicate to handle, which brings on difficulty in a motor assembly line. Moreover, so that the output signal of the sensor is reproducible and consequently usable under good conditions, its positioning with respect to the rotor must be accurate, which increases the difficulty of positioning.

From the U.S. Pat. No. 3,548,224 is known an electric motor with radial air gap comprising a rotor, a stator having a magnetic circuit and windings which form winding heads which project with respect to the magnetic circuit at the axial ends thereof, a case whose end wall extends radially and a sensor of the position of the rotor fixed on an electrically insulating disc separating said end wall from the winding heads situated on the same side as this wall, applied and immobilized against said case.

In this known motor the sensor terminals are connected to connector pins which pass through the end wall of the case opposite the sensor.

The aim of the present invention is to provide a new conception of the arrangement of a position sensor for the rotor in an electric motor wherein the sensor terminals are connected to connecting wires issuing from the case at a point remote from the sensor, such arrangement taking up very little space axially and allowing easy and accurate positioning of the position sensor in an assembly line.

According to the invention, the motor of the above-defined type is characterized in that the sensor has terminals connected to connecting wires which issue from the case at a point remote from the connection point thereof with said terminals and that the internal face of the disc has guide means for leading the wires from one point to the other while passing at a distance from the rotor and from the winding heads which come very close to the end wall.

By guiding the connecting wires at a distance from the winding heads, overlapping of their axial dimensions is allowed. Thus, there is no need to provide beyond the winding heads a free axial space for housing the wires. Thus, the electric motor in accordance with the invention takes up very much less space axially. Moreover, the sensor and its connecting wires are very easy to mount, for this sensor and its wires are prepositioned in the disc.

With these arrangements, the problem posed in accordance with the invention is solved efficiently and with remarkable economy of means.

According to an advantageous embodiment of the invention, the guide means comprise a peripheral flange and axial ribs forming a peripheral passage, which forms very simple and efficient means for positioning the wires.

Preferably, covering elements radially extending from these ribs cover the connecting wires towards the magnetic circuit.

The outer contour of the disc may be approximately circular, with a diameter allowing insertion thereof with clearance into the case and having truncations which cooperate with flat portions of the axial wall of the case to provide angular fixing thereof. This axial wall has for example the shape of a collar. The insulating disc may further have resilient appendices which bear on the flat portions to provide complete immobilization of the disc, whereas the same appendices or similar may extend substantially to the magnetic circuit of the stator, to provide axial fixing of the disc.

Other characteristics of the invention may further facilitate insertion of the sensor into small-sized motors, particularly that of a flat fan.

Thus, the sensor may be housed at least partially in a depression formed in the face of the disc turned towards the end wall of the case and/or in a depression formed in the face of the end wall turned towards the disc. Thus, the axial space taken up by the wall-disc-sensor assembly may be reduced to the sum of the thicknesses of the wall and of the disc, the additional space taken up by the sensor being zero.

The invention also relates to a process for mounting a motor such as described above, according to which the disc equipped with the position sensor and connecting wires is immobilized against the case for assembling this latter with the stator, the disc and the stator being fixed in the case and the connecting wires positioned on the disc so that the winding heads of the stator face zones of the disc free from the presence of the wires.

The invention further provides a subassembly for such a motor, formed by the support on which the position sensor is fixed provided if need be with connecting wires.

Other characteristics of the invention will be clear from the detailed description given hereafter, by way of illustration and in no way limiting, and the accompanying drawings in which:

FIG. 1 is a partial view in section along line I—I of FIG. 4, of a flat ventilator incorporating a motor according to the invention;

FIG. 2 is a view, in the direction of arrow F of FIG. 3, of the insulating disc belonging to this motor;

FIG. 3 is a view, along arrow F1 of FIG. 1, of the subassembly of the invention comprising the insulating disc, the sensor and the connecting wires;

FIG. 4 is a view, in the direction of arrow F2 of FIG. 1, showing the subassembly of FIG. 3 positioned in the case of the motor; and FIG. 5 is an enlarged part of the section of FIG. 1, in which the rotor and the stator do not appear.

The motor of the fan shown partially in FIG. 1 comprises a rotor 1 rotating about an axis X–X' and a stator 2 surrounding the rotor 1 and fixed in a metal case 40 comprising an end wall 3 and a collar 4. The stator 2 comprises a magnetic circuit 5 and two windings which form winding heads projecting at the axial ends of the magnetic circuit 5. The winding heads 6 situated on the same side as wall 3, and one of which can be seen in FIG. 1, are separated therefrom by an electrically insulating disc 7. A position sensor 8 comprising a Hall generator is disposed between the rotor 1 and the wall 3 so as to be influenced by the poles of permanent magnets 9 carried by the rotor 1 and facing wall 3. Magnets 9 may be fixed to the rotor as described in the French patent application No. 2 422 167. The rotor rotates about a shaft, not shown, fixed in a central boss 10 of the end wall 3 of case 40.

Besides the motor, the fan comprises a propeller, not shown, secured to rotor 1 and provided with blades rotating about the motor, and a frame surrounding the blades and firmly secured to the case of the motor by means of four radial arms 11, one of which is provided with a passageway 12 in which pass the supply wires 13 for the motor and which communicates with the inside of case 40 through an opening 14 provided therein.

According to the invention, sensor 8 is fixed to the insulating disc 7 which serves as support therefor and is applied and immobilized against case 40.

As can be seen more particularly in FIG. 3, disc 7, whose dimensions are large with respect to those of the sensor, has the general shape of a ring defined by two concentric circles, on which are projected the winding heads, as shown at 6a in FIG. 4. The central recess 7a of disc 7 allows the boss 10 of the case to pass therethrough and a peripheral notch 15 is provided opposite the opening 14 of the case. The outer diameter of disc 7 allows the insertion thereof with clearance into the collar 4 of the case, and angular fixing thereof is provided by truncations 16 cooperating with flat portions 17 of the collar 4 which also serve for fixing the stator 2 angularly. Preferably, disc 7 has, as shown in FIGS. 3 and 4, resilient appendices 18 which bear on the flat portions 17 and provide complete immobilization of disc 7 when the external face of this latter itself bears against the end wall 3 of the case. The appendices 18 may extend axially substantially to the magnetic circuit 5 of the stator and thus complete the axial fixing of disc 7 by preventing any movement thereof in the case of a shock or vibrations, for example. The position of the end face of the magnetic circuit is defined by abutments projecting from the collar 4, not shown for the sake of clarity of the drawing.

Sensor 8 is partially housed in a depression 19 formed in the external free (the one turned towards wall 3) of disc 7 and is held clamped by a flange 20 of the disc projecting towards wall 3. A depression 21 is further provided in the internal face of this latter for receiving sensor 8 and flange 20 without increasing the axial space taken up by the assembly. Sensor 8 bears on the bottom of depression 21 and is thus placed at an accurately reproducible distance from the magnets 9 of rotor 1. The bearing point of sensor 8 forms preferably a projection 22 on the bottom of depression 21. This projection 22 is obtained by means of a hollow in the mold used for producing the case. This hollow is relatively protected against erosion and maintains accurate dimensions during the whole life of the mold. As can be seen more particularly in FIG. 4, the winding heads 6 (shown by their projections 6a) are disposed symmetrically with respect to the axis XX' of the motor and are separated by two diametrically opposite free spaces 23 and 24. The opening 14 for passage of the supply wires 13 therethrough (FIG. 1) leading to passageway 12 is situated opposite space 23. Supply wires 13 are connected to the windings in space 23, so that there is no room left in it for connecting the terminals of sensor 8. Moreover providing depression 21 near opening 14 would weaken wall 3 too much. For these reasons, sensor 8 is placed so that its terminals 26 are connected at a connecting point 25 as located in the other space 24 to the connecting wires 25 supplying the sensor with power and transmitting its output signal, which also pass through opening 14 and passageway 12. Wires 25 must go from one to the other of these diametrically opposite points by passing at a certain distance from rotor 1 as well as from the winding heads 6 which come very close to wall 3. To this end, disc 7 comprises guide means for guiding wires 25 through the annular space 27 available outside heads 6, that is to say between these latter and collar 4. These guide means comprise an axially directed peripheral flange 28 and axial ribs 29 forming a peripheral passage 30, and covering elements 21 extending radially in places from ribs 29 and covering wires 25 towards the magnetic circuit 5 (for the sake of clarity, rib 29 and elements 31 have been shown in FIGS. 1 and 5 as if they were present in the sectional plane).

With sensor 8 located on the external face of disc 7 and connected to wires 25 on the internal face, its terminals 26 pass through this disc 7 through apertures 32. A comb 33 projecting from the internal face of disc 7 allows the ends of wires 26 to be nipped, thus facilitating soldered connections.

The preassembled subassembly formed by disc 7, sensor 8 and wires 25 may be very easily positioned in the case of the motor, on the assembly line. When assembling the fan described, it is advantageous to introduce first of all the free part of wires 25 (outside the guide passages) and to bring it out through aperture 14 before applying disc 7 against wall 3. The stator 2 is positioned in its turn. Because disc 7 is fixed angularly and wires 25 are guided in the peripheral passage 30, the zones 6a of disc 7 opposite, which bear the winding heads 6 of the stator, are free from the presence of wires 25.

The subassembly may be assembled outside of the assembly line. This assembly is facilitated by depression 19 and flange 20 which provide reliable positioning of sensor 8, the apertures 32 which guide terminals 26, comb 33 which immobilizes the ends of wires 25 in the appropriate position for connection and the guide means 28, 29, 30, 31 which determine without hesitation the path to be followed by the wires.

Of course, the invention is not limited to the embodiment described by way of example. Its application is in particular independent of the relative arrangement of the rotor 1 and stator 2, this latter being able to be more especially located within the former, of the number and relative arrangement of the windings of the rotor, of the use of the motor, which may drive any apparatus other than a fan, and of the use of the signal of the position sensor, etc.

What is claimed is:

1. An electric motor with radial air gap comprising a rotor (1), a stator (2) having a magnetic circuit (5) and two windings which form two winding heads (6) projecting with respect to the magnetic circuit at the axial ends thereof, a case (40) having an end wall (3) that extends radially and a sensor (8) for detecting the position of the rotor fixed on an electrically insulating disc (7) separating said end wall (3) from the winding heads (6), said sensor (8) being situated on the same side of said disc (7) as said wall, said disc (7) being applied and immobilized against said case (40), said sensor (8) having terminals (26) connected to connecting wires (25) which issue from the case (40) at a point remote from the connection point (25a) thereof with said terminals, and the internal face of the disc having guide means (28, 29, 30, 31) for leading the wires from one point to the other while passing at a distance from the rotor (1) and the winding heads (6), said winding heads (6) being very close to the end wall (3), wherein said stator (2) is peripheral and said guide means cause the connecting wires (25) to pass into an annular space (27) about the winding heads (6), said two winding heads being separated by two diametrically opposite free spaces (23,24) and the outlet point of the wires facing one of said free spaces and the connection point (25a) being in the other one of said free spaces.

2. The motor according to claim 1, wherein said guide means comprise a peripheral flange (28) and axial ribs (29) forming a peripheral passage (30).

3. The motor according to claim 1, wherein covering elements (31) radially extending from the ribs (29) cover the connecting wires (25) on the side of the magnetic circuit (5).

4. The motor according to claim 1, wherein the terminals (26) of the sensor (8) pass through the thickness of the disc (7) between the sensor fixed on the external face of the disc to the connecting point situated on the internal face of the disc.

5. The motor according to claim 1, wherein the external face of said disc (7) bears against said end wall (3) and its periphery coacts with an axial wall (4) of said case for immobilizing the disc.

6. The motor according to claim 5, wherein the external contour of said disc (7) is substantially circular with a diameter allowing insertion thereof with clearance into said case (40) and has truncations (16) which coact with flat portions (17) of said axial wall (4) to ensure angular fixing of said disc.

7. The motor according to claim 6, wherein the disc (7) has resilient appendices (18) which bear on said flat portions (17) and provide complete immobilization of the disc, the external face of the disc bearing against the end wall (3) of the case (40).

8. The motor according to claim 5, wherein the disc has axial fixing appendices (18) which extend substantially to the magnetic circuit of the stator (2).

9. The motor according to claim 5, wherein the sensor (8) is housed at least partially in a depression (19) provided in the face of the disc (7) that is adjacent said wall (3).

10. The motor according to claim 5, wherein the sensor is housed at least partially in a depression (21) provided in the face of said wall (3) that is adjacent the disc (7).

11. The motor according to claim 10, wherein the sensor (8) bears on the bottom of said depression (21) of the wall.

12. The motor according to claim 11, wherein the sensor (8) bears on a projection (22) provided at the bottom of the depression (21) of the wall (3).

* * * * *